United States Patent [19]

Hamada et al.

[11] Patent Number: 4,608,395

[45] Date of Patent: Aug. 26, 1986

[54] SILICONE SPONGE RUBBER COMPOSITION

[75] Inventors: Mitsuo Hamada; Kazuo Higuchi, both of Chiba, Japan

[73] Assignee: Toray Silicone Company, Ltd., Tokyo, Japan

[21] Appl. No.: 776,549

[22] Filed: Sep. 16, 1985

[30] Foreign Application Priority Data

Oct. 31, 1984 [JP] Japan .................. 59-229493

[51] Int. Cl.$^4$ ............................... C08V 9/00
[52] U.S. Cl. ............................ 521/92; 521/125; 521/134; 521/154; 525/8; 525/7; 528/15; 528/31; 528/32
[58] Field of Search ............ 525/4, 7, 8; 528/15, 528/31, 32; 521/92, 125, 154, 134

[56] References Cited

U.S. PATENT DOCUMENTS

| | | | |
|---|---|---|---|
| 3,428,580 | 2/1969 | Nitzsche et al. | 260/2.5 |
| 3,923,705 | 12/1975 | Smith | 260/2.5 S |
| 4,492,775 | 1/1985 | Koshii et al. | |

FOREIGN PATENT DOCUMENTS

| | | |
|---|---|---|
| 8-9297 | 10/1933 | Japan . |
| 38-33508 | 6/1963 | Japan . |
| 45-9474 | 3/1970 | Japan . |
| 50465 | 5/1975 | Japan . |
| 46352 | 4/1976 | Japan . |
| 16564 | 2/1977 | Japan . |
| 81378 | 7/1977 | Japan . |
| 36556 | 4/1978 | Japan . |
| 58-40348 | 3/1983 | Japan . |
| 58-79030 | 8/1983 | Japan . |

*Primary Examiner*—Morton Foelak
*Attorney, Agent, or Firm*—Robert Spector

[57] ABSTRACT

This invention provides organosiloxane compositions that are stable under ambient conditions and convert to cured sponge rubber when heated.

The compositions comprise an alkenyl-substituted polyorganosiloxane, a polyorganohydrogensiloxane, a platinum-type catalyst, a platinum catalyst inhibitor and an alkaline earth metal compound exhibiting a pH of at least 10.0.

7 Claims, No Drawings

SILICONE SPONGE RUBBER COMPOSITION

BACKGROUND OF THE INVENTION

1. Field of the Invention

This invention relates to heat curable organosiloxane compositions. More particularly, this invention relates to organosiloxane compositions exhibiting a useful pot life at ambient temperature and the ability to form cured sponge rubber when heated.

2. Background Information

Organosiloxane compositions useful for forming silicone sponge rubber can be classified into two categories based on the mechanism used to generate the gas which forms the sponge. One category of compositions lacks a mechanism to generate a gas as part of the curing reaction, and therefore contains a heat activated foaming agent. Compositions of this type are disclosed in Japanese Pat. No. 69-461 and Japanese Unexamined Applications Nos. 75-50465, 76-46352, 77-81378 and 83-79030. In the second category the gas is generated as a by-product of the curing reaction. Compositions of this type are disclosed in Japanese Pat. Nos. 58-9297 and 70-9497, Japanese Unexamined Application Nos. 77-16564, 78-36556 and 83-40348 and U.S. Pat. No. 3,428,580, which issued to Nietzsche et al. on Feb. 18, 1969.

Japanese Unexamined Application No. 77-16564, published on Feb. 7, 1977, discloses foamable compositions prepared using a vinyl substituted dimethylsiloxane polymer, an organohydrogensiloxane containing at least two silicon-bonded hydrogen atoms per molecule, wet processed silica and a platinum catalyst.

Compositions corresponding to the aforementioned second category typically exhibit a short time interval between combining of all ingredients and foaming and curing of the resultant reaction mixture at ambient temperature. This interval is typically referred to as "pot life." In accordance with the teaching of U.S. Pat. No. 3,923,705 that issued to Smith on Dec. 2, 1985, a small quantity of platinum catalyst inhibitor such as a cyclic methylvinylsiloxane or an acetylenic alcohol can be added to extend pot life. When these inhibitors are used to extend the pot life of a foamable composition beyond ten minutes, the resultant sponge rubber exhibits the disadvantages of large cell size and reduced uniformity.

U.S. Pat. No. 4,492,775 that issued in the name of Koshii et al. on Jan. 8, 1985 teaches foamable compositions containing a hydroxyl-substituted polyorganosiloxane, an organohydrogensiloxane, a platinum catalyst, a platinum catalyst inhibitor and a finely divided filler in combination with (1) an organosilicon compound containing at least 0.5 weight percent of carboxyl groups or silicon-bonded hydroxyalkyl groups, or (2) a partially esterified polyfunctional alcohol. In addition to being nonflowable, the pot life of the compositions is extended without adversely affecting the structure of the cured foam.

An objective of this invention is to provide a method for extending the pot life of foamable compositions containing an alkenyl-substituted polyorganosiloxane, an organohydrogensiloxane and a platinum catalyst in the absence of any hydroxyl containing compounds other than atmospheric moisture. A second objective of this invention is to provide polyorganosiloxane compositions exhibiting commercially useful pot lives. When heated the compositions yield cured sponge rubber exhibiting a uniform distribution of small cells.

SUMMARY OF THE INVENTION

It has now been found that the objectives of this invention can be achieved by including a platinum catalyst inhibitor together with an alkaline earth metal compound exhibiting a pH greater than 10.0 in a foamable composition comprising an alkenyl-substituted polyorganosiloxane, an organohydrogensiloxane and a platinum-type catalyst.

DETAILED DESCRIPTION OF THE INVENTION

This invention provides an organosiloxane composition exhibiting a useful pot life under ambient conditions and the ability to form cured sponge rubber when heated, said composition comprising (A) 100 parts by weight of a polyorganosiloxane comprising units of the general formula

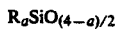
$$R_a SiO_{(4-a)/2}$$

and at least two units per molecule of the general formula

$$R_b^1 R_c^2 SiO_{(4-b-c)/2}$$

where R and $R^1$ represent monovalent hydrocarbon or substituted hydrocarbon radicals free of ethylenic unsaturation, $R^2$ represents an alkenyl radical, a represents an integer from 1 to 3, inclusive, b represents an integer from 0 to 2, inclusive, c is 1 or 2, and the sum of b and c is 1, 2 or 3; (B) an organohydrogensiloxane comprising units of the general formula

$$R_d^3 SiO_{(4-d)/2}$$

and at least two units per molecule of the general formula

$$R_e^4 H_f SiO_{(4-e-f)/2}$$

where $R^3$ and $R^4$ are individually selected from the same group as R, d represents an integer from 1 to 3, inclusive, e represents an integer from 0 to 3, inclusive, f represents the integer 1, 2 or 3, the sum of e and f is 1, 2 or 3, and the concentration of (B) is equivalent to from 3 to 100 moles of silicon-bonded hydrogen atoms per mole of alkenyl radicals present in (A); (C) from 0.1 to 50 parts by weight of an alkaline earth metal compound exhibiting a pH of at least 10.0; (D) from 0.001 to 3 parts by weight of a platinum catalyst inhibitor, and (E) an amount of a platinum-type catalyst sufficient to catalyze foaming and curing of said composition when heated.

Ingredient (A), a polyorganosiloxane containing alkenyl groups in the molecule, is the principal ingredient of the present organosiloxane composition. R and $R^1$ in the foregoing formula for (A) represent monovalent hydrocarbon radicals which do not possess aliphatic unsaturation. Concrete examples of R and $R^1$ include alkyl such as methyl, ethyl and propyl; substituted alkyl such as 2-phenylethyl, 2-phenylpropyl and 3,3,3-trifluoropropyl and aryl or substituted aryl radicals such as phenyl and tolyl. $R^2$ is an alkenyl radical such as vinyl, allyl or propenyl. Each molecule of ingredient (A) must contain at least 2 units of the general formula

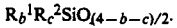
$$R_b^1 R_c^2 SiO_{(4-b-c)/2}.$$

The other organosiloxane units of (A) correspond to the general formula

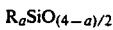
$$R_a SiO_{(4-a)/2}$$

where R is as defined hereinabove and a is 1, 2 or 3. Ingredient (A) can contain a small quantity of hydroxyl groups or alkoxy groups such as methoxy, ethoxy, propoxy or methoxyethoxy. The alkenyl radicals can be located at terminal positions of the molecule, in a side chain or at both of these positions. The molecular structure of (A) can be a straight chain, a branched chain, a cyclic structure or a network. The viscosity of (A) is not critical and can be anywhere within the range of from 0.1 Pa.s at 25° C. to the viscosity of a silicone rubber gum.

Ingredient (B) of the present compositions is a polyorganohydrogensiloxane. This ingredient is responsible for curing and foaming of the composition because it generates hydrogen when catalyzed by an alkali metal compound referred to herein as ingredient (C). Each molecule of (B) contains at least 2 units of the general formula

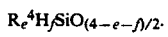

$R_e^4H_fSiO_{(4-e-f)/2}$.

Ingredient (B) also contains siloxane units of the formula

$R^3_dSiO_{(4-d)/2}$ where $R^3$, $R^4$, d, e and f are defined hereinbefore.

Ingredient (B) can contain a small quantity of hydroxyl groups or alkoxy groups such as methoxy, ethoxy, propoxy or methoxyethoxy. The silicon-bonded hydrogen atoms can be present at the molecular terminals, in side chains or at both of these positions. The molecular structure of (B) can be a straight chain, a branched chain, a cyclic structure or a network. The viscosity of the polyorganohydrogensiloxane is not critical, but is preferably from 0.03 to 10 Pa.s at 25° C.

The amount of organohydrogensiloxane in the present compositions is sufficient to supply from 3 to 100 equivalents of silicon-bonded hydrogen atoms for each equivalent of alkenyl radicals in ingredient (A). When (B) contains fewer than 3 equivalents of silicon-bonded hydrogen, the composition will not foam adequately. On the other hand, when the quantity of silicon-bonded hydrogen exceeds 100 equivalents per equivalent of alkenyl radical, some silicon-bonded hydrogen will remain unreacted.

Ingredient (C) of the present compositions is a catalyst that promotes generation of hydrogen gas from (B). The hydrogen is, in turn, responsible for foaming of the composition. Ingredient (C) is an alkaline earth metal compound exhibiting a pH of at least 10.0. If the pH is less than 10.0, the compound will not function as a catalyst. As used in this specification the pH of (C) is an equilibrated value measured at 25° C. using a 4 weight percent dispersion of (C) in ion-exchanged water exhibiting a pH of 7.0 at 25° C.

Ingredient (C) is a hydroxide, oxide, peroxide or carbonate of an alkaline earth metal. Representative alkaline earth metal compounds include, but are not limited to, oxides such as beryllium oxide, magnesium oxide, calcium oxide, strontium oxide and barium oxide; hydroxides such as barium hydroxide, calcium hydroxide and strontium hydroxide; peroxides such as magnesium peroxide and strontium peroxide and carbonates such as barium carbonate, magnesium carbonate and strontium carbonate. These compounds can be used singly or as mixtures of 2 or more compounds. The concentration of ingredient (C) is generally from 0.1 to 50 parts by weight per 100 parts by weight of ingredient (A). The preferred concentration range is a function of the pH of ingredient (C), as shown in the following table.

| pH of C @ 25° C. | Parts by Wt of C |
|---|---|
| 10.0–11.0 | 1.0–50 |
| 11.0–13.0 | 0.5–30 |
| greater than 13.0 | 0.1–10 |

The platinum catalyst inhibitor, ingredient (D), prevents or retards a hydrosilation reaction between ingredients (A) and (B) at room temperature and regulates foaming during curing. Representative inhibitors include alkynyl alcohols such as 3-methyl-1-butyn-3-ol, 3,5-dimethyl-1-hexyn-3-ol, 3-methyl-1-pentyn-3-ol and phenylbutynol; acetylenic hydrocarbons such as 3-methyl-3-penten-1-yne and 3,5-dimethyl-3-hexen-1-yne; and cyclic tetravinyltetralkylsiloxanes. The inhibitors can be used singly or as mixtures of 2 or more of these compounds. The concentration of ingredient (D) is typically from 0.001 to 3 parts by weight per 100 parts of ingredient (A).

The hydrosilation reaction between ingredients (A) and (B) is promoted by the platinum-type catalyst, referred to hereinbefore as ingredient (E). Examples of useful catalysts include finely powdered platinum, finely powdered platinum adsorbed on a carbon powder support, chloroplatinic acid, alcohol-modified chloroplatinic acid, chloroplatinic acid-olefin complexes, chloroplatinic acidvinylsiloxane coordination compounds, platinum black, palladium and rhodium. The concentration of ingredient (E) depends on the type of catalyst used and is generally equivalent to from 1 to 2,000 parts per million (ppm) by weight of platinum group metal relative to the weight of polyorganosiloxane.

The sponge-forming organosiloxane compositions of this invention can be prepared by blending the required quantities of ingredients (A), (B), (C), (D) and (E) with one another using any method that yields a homogeneous mixture. To maximize storage stability, ingredient (B) is preferably added after ingredient (A) has been blended with ingredients (D) and (E).

As necessary, inorganic fillers, antistatics, thermal stabilizers, flame retardants, pigments, glass fibers and carbon fiber can optionally be included in the present compositions.

Examples of suitable inorganic fillers include finely divided silicas such as fumed silica and precipitated silica, diatomaceous earth, finely divided quartz, iron oxide, titanium oxide, aluminum oxide, aluminum silicate, clay, zinc oxide and carbon black. The fillers can be used singly or as mixtures of 2 or more. The surfaces of these inorganic fillers are optionally treated with organosilicon compounds such as organochlorosilanes, polydiorganosiloxanes or hexaorganodisilazanes. The quantity of filler added is typically from 1 to about 150 parts by weight, preferably from 5 to 100 parts, per 100 parts by weight of ingredient (A).

The present compositions can be fabricated by injection molding, casting or other known techniques. The resultant article is then heated at from 50° to 200° C. for a period of from 2 to 60 minutes to produce a sponge rubber product.

This invention will be explained using the following non-limiting examples. All parts and percentages are by weight. The reported pH values are equilibrated values, measured at 25° C., of a 4 weight percent dispersion of the alkaline earth metal compound in ion-exchanged water exhibiting a pH of 7.0 at 25° C.

EXAMPLE 1

100 parts of a dimethylvinylsiloxy endblocked polydimethylsiloxane exhibiting a viscosity of 10 Pa.s at 25° C. were mixed to homogeneity at room temperature with 20 parts finely divided silica available as Aerosil 200 from Degussa, Inc. and 4 parts hexamethyldisilazane, and then heated at 180° C. for 2 hours. The resulting mixture is designated as masterbatch (I).

100 parts masterbatch (I) were mixed to homogeneity with 0.5 parts of a 2-ethylhexanol solution of chloroplatinic acid containing 0.05% platinum and 0.2 parts 3,5-dimethyl-1-hexyne-3-ol using a three-roll mill. The resultant mixture was then combined and blended to homogeneity with 7 parts of a dimethylsiloxane-methylhydrogensiloxane copolymer exhibiting a viscosity of 0.1 Pa.s at 25° C. and a silicon bonded hydrogen content of 0.7% and 10 parts magnesium oxide exhibiting a pH of 10.0.

The resulting organosiloxane composition of this invention was placed on an aluminum plate and heated in an oven at 150° C. for 5 minutes to yield a cured sponge rubber.

The expansion ratio of the resultant composition was 2. An inspection of the sponge's cross section revealed a uniform distribution of cells exhibiting diameters of 1 mm or less.

An organosiloxane composition identical to the above was stored at 25° C. for 3 days after preparation and then foamed and cured as described hereinabove. The silicone sponge rubber product exhibited a uniform cell structure identical to that of the sponge rubber obtained immediately after preparing the organosiloxane composition.

EXAMPLE 2

An organosiloxane composition identical to that described in Example 1 was prepared, with the exception that 5 parts barium oxide exhibiting a pH of 12 were used in place of the magnesium oxide. The composition was foamed and cured as described in Example 1.

The expansion ratio of the sponge rubber was 2. An examination of the product's cross section revealed a uniform distribution of cells having diameters of 1 mm or less.

This composition was also stored at 25° C. for 2 days before being foamed and cured. An examination of the cured sponge revealed uniform cells identical to those of the sponge rubber formed immediately after preparation of the organosiloxane composition.

EXAMPLE 3

An organosiloxane composition identical to that described in the foregoing example 1 was prepared, with the exception that 1 part barium hydroxide exhibiting a pH of 13 was substituted for the magnesium oxide. The resultant composition was then foamed and cured using the method described in Example 1.

The expansion ratio of the sponge rubber was 3. An inspection of the cured product's cross section revealed a uniform distribution of cells having diameters of 1 mm or less.

This organosiloxane composition was stored at 25° C. for 3 days before being foamed and cured by the foregoing method. The cell structure of the sponge was identical to that of the sponge formed immediately after preparation of the organosiloxane composition.

EXAMPLE 4

An organosiloxane composition identical to the one described in Example 1 was prepared, with the exception that 2 parts of strontium oxide exhibiting a pH of 12.9 were added in place of the magnesium oxide. The resultant organosiloxane composition was then foamed and cured by the method described in Example 1.

The expansion ratio of the resultant sponge rubber was 3. An examination of the product's cross section revealed a uniform distribution of cells having diameters of 1 mm or less.

This composition was also stored at 25° C. for 3 days before being foamed and cured by the above method. The sponge rubber product had uniform cells identical to those of the product foamed immediately after preparation of the organosiloxane composition.

COMPARISON EXAMPLE 1

An organosiloxane composition outside the scope of this invention was prepared and cured as described in Example 1, with the exception that the magnesium oxide was omitted. The product did not have a cellular structure.

COMPARISON EXAMPLE 2

An organosiloxane composition identical to that described in Example 1 was prepared, with the exception that 10 parts barium sulfate (pH 8.0) were used in place of the magnesium oxide. The resultant composition was cured using the method described in Example 1. The resultant cured material did not have a cellular structure.

EXAMPLE 5

Masterbatch II was prepared by blending to homogeneity 100 parts of a vinyl terminated polydimethylsiloxane exhibiting 0.26% vinyl radicals and a viscosity of 3.0 Pa.s at 25° C., with 30 parts finely divided silica available as Silanox-101 from Cabot Corp. and 4 parts hexamethyldisilazane at room temperature and then heating the mixture at 180° C. for 3 hours. 100 parts of masterbatch (II) were blended to homogeneity with 0.8 parts of an isopropanol solution of chloroplatinic acid having a platinum content of 0.05 percent and 0.3 parts 3-methyl-1-butyn-3-ol using a kneader. The resultant mixture was blended with 4 parts methylhydrogensiloxane containing 1.6 percent silicon-bonded hydrogen and exhibiting a viscosity of 0.2 parts at 25° C. and 4 parts calcium hydroxide exhibiting a pH of 12.6 to obtain an organosiloxane composition of this invention.

The resulting composition was foamed and cured as described in Example 1. The expansion ratio of the sponge rubber product was 2.5. Visual inspection of the product's cross section revealed a uniform distribution of cells measuring 1 mm or less throughout the interior of the rubber.

The same organosiloxane composition was stored at 25° C. for 3 days before being foamed and cured by the method described in this example. The sponge rubber product had uniform cells identical to those of the product formed immediately after preparation of the organosiloxane composition.

COMPARISON EXAMPLE 3

This example demonstrates the poor quality of sponge rubber obtained by the known reaction of a hydroxyl substituted polyorganosiloxane with an organohydrogensiloxane in the presence of a platinum catalyst.

100 parts hydroxyl end-blocked polydimethylsiloxane exhibiting a viscosity of 4.0 Pa.s at 25° C. were blended to homogeneity with 1 part methylvinylcyclotetrasiloxane and 0.5 parts chloroplatinic acid-vinylsiloxane complex having a platinum content of 0.05 percent. The operation was carried out at room temperature. The resulting mixture was thoroughly blended with 3 parts methylhydrogen-polysiloxane exhibiting a viscosity of 0.05 Pa.s at 25° C. and a silicon-bonded hydrogen content of 1.5%. This composition formed a cured sponge rubber after about 10 minutes at 25° C.

A visual examination of the product's cross section revealed a non-uniform distribution of cells measuring from 1 to 8 mm in diameter.

The preceding examples demonstrate that the organosiloxane compositions of this invention do not foam or cure at room temperature, but rather have an extended pot life. The compositions begin to foam and cure only upon heating, exhibit no disadvantages during fabrication and yield a sponge rubber exhibiting a uniform distribution of small cells.

The silicone sponge rubber produced by the present invention is suitable for use as packing, stoppers, cosmetic powder puffs and cushioning material.

That which is claimed is:

1. An organosiloxane composition exhibiting a useful pot life under ambient conditions and the ability to form cured sponge rubber when heated, said composition comprising (A) 100 parts by weight of a polyorganosiloxane comprising units of the general formula $$R_a SiO_{(4-a)/2}$$

and at least two units per molecule of the general formula $$R^1_b R^2_c SiO_{(4-b-c)/2}$$

where R and $R^1$ represent monovalent hydrocarbon or substituted hydrocarbon radicals free of ethylenic unsaturation, $R^2$ represents an alkenyl radical, a represents an integer from 1 to 3, inclusive, b represents an integer from 0 to 2, inclusive, c is 1 or 2, and the sum of b and c is 1, 2 or 3;

(B) an organohydrogensiloxane comprising units of the general formula $$R^3_d SiO_{(4-d)/2}$$

and at least two units per molecule of the general formula $$R^4_e H_f SiO_{(4-e-f)/2}$$

where $R^3$ and $R^4$ are individually selected from the same group as R, d represents an integer from 1 to 3, inclusive, e represents an integer from 0 to 3, inclusive, f represents the integer 1, 2 or 3, the sum of e and f is 1, 2 or 3, and the concentration of (B) is equivalent to from 3 to 100 moles of silicon-bonded hydrogen atoms per mole of alkenyl radicals present in (A);

(C) from 0.1 to 50 parts by weight of an inorganic alkaline earth metal compound exhibiting a pH of at least 10.0;

(D) from 0.001 to 3 parts by weight of a platinum catalyst inhibitor; and (E) an amount of a platinum-type catalyst sufficient to catalyze foaming and curing of said composition when heated.

2. A composition according to claim 1 where R, $R^1$, $R^3$ and $R^4$ are methyl and $R^2$ is vinyl.

3. A composition according to claim 1 where A is a dimethylvinylsiloxy endblocked polydimethylsiloxane.

4. A composition according to claim 1 where the viscosity of (A) is from 3 to 10 Pa.s at 25° C. and the viscosity of (B) is from 0.3 to 10 Pa.s at 25° C.

5. A composition according to claim 1 where (C) is at least one member selected from the group consisting of oxides of beryllium, magnesium, calcium, strontium and barium; hydroxides of barium, calcium and strontium; peroxides of magnesium and strontium; and carbonates of barium, magnesium and strontium.

6. A composition according to claim 1 where from 1.0 to 50 parts of (C) are present when (C) exhibits a pH of from 10.0 to 11.0; 0.5 to 30 parts of (C) are present when (C) exhibits a pH of from 11.0 to 13.0 and from 0.1 to 10 parts of (C) are present when (C) exhibits a pH greater than 13.

7. A method for preparing a silicone sponge rubber, said method comprising heating the composition of claim 1 at a temperature of from 50 to 200° C. for a period of from 2 to 60 minutes.

* * * * *